United States Patent [19]

Butter et al.

[11] 3,768,256

[45] Oct. 30, 1973

[54] THRUST GAS GENERATOR HAVING A COMBUSTION CHAMBER AND THRUST NOZZLE REGENERATIVELY COOLED BY A LIQUID

[75] Inventors: Karl Butter, Munich; Michael Kaufmann, Neubiberg; Helmut Dederra, Ottobrunn, all of Germany

[73] Assignee: Messerschmitt-Bolkow-Blohn, Gesellschaft mit beschrankter Haftung, Ottobrunn, near Cologne, Germany

[22] Filed: Aug. 12, 1970

[21] Appl. No.: 63,168

[30] Foreign Application Priority Data
Aug. 14, 1969 Germany.................. P 19 41 296.5

[52] U.S. Cl..................... 60/260, 60/267, 29/460, 204/9, 204/16
[51] Int. Cl............................................ F92k 11/02
[58] Field of Search................... 60/260, 267, 39.66, 60/39.71, 259; 29/460; 204/9, 16

[56] References Cited
UNITED STATES PATENTS

| | | | |
|---|---|---|---|
| 3,690,103 | 9/1972 | Dederra et al. | 60/39.66 X |
| 2,603,593 | 7/1952 | Blickensderfer | 204/16 |
| 2,569,368 | 9/1951 | Bradner | 204/16 |
| 2,094,483 | 9/1937 | Weder | 204/16 |
| 2,608,529 | 8/1952 | Varian | 29/460 |
| 3,524,319 | 8/1970 | Stockel | 60/260 X |
| 2,844,939 | 7/1958 | Schultz | 60/267 X |
| 3,289,943 | 12/1966 | Thomas et al. | 60/39.66 X |
| 2,977,754 | 4/1961 | Bell | 60/260 |
| 3,467,583 | 9/1969 | Naimer | 60/267 |
| 3,022,230 | 2/1962 | Fialkoff | 60/39.66 |
| 3,460,759 | 8/1969 | Gregory et al. | 60/260 |

OTHER PUBLICATIONS

Fialkoff, S., American Rocket Society, Liquid Rockets and Propellants, Academic Press, N.Y., 1960, pp. 563–583 (Patent Office Library).

*Primary Examiner*—Carlton R. Croyle
*Assistant Examiner*—Robert E. Garrett
*Attorney*—McGlew and Toren

[57] ABSTRACT

A thrust gas generator includes a combustion chamber and a nozzle including a converging portion terminating in a nozzle neck and a diverging outer portion extending from the neck to the thrust gas discharge. The combustion chamber proper and/or also the converging thrust nozzle part and the thrust nozzle neck comprises an inner part with a solid base wall body having cooling channels which are machined into the exterior thereof and which extend longitudinally and which include an outer wall which covers the cooling channels and which is applied by electroplating. An outer end part includes the divergent outer end of the thrust nozzle which is constructed of capillary tubes which are arranged at least over a portion of their lengths with spaces therebetween and around the longitudinal axis of the thrust nozzle and they have a constant cross section over at least a major portion of their length. A closed electroplated layer connects the tubes and it is applied firmly over a portion of the periphery of each tube and extends between the spaces of the tubes to bind the tubes into a single unit. The inner part and the outer parts are interconnected by a solid intermediate part by the electroplated layer which also covers and interconnects the tubes. The connection between the capillary tubes of the outer part and the longitudinally extending passages of the intermediate part is effected especially by soldering or welding of adjacent tube ends into the longitudinal passages in a mechanically strong and pressure-tight manner.

15 Claims, 4 Drawing Figures

United States Patent
Butter et al.
[11] 3,768,256
[45] Oct. 30, 1973
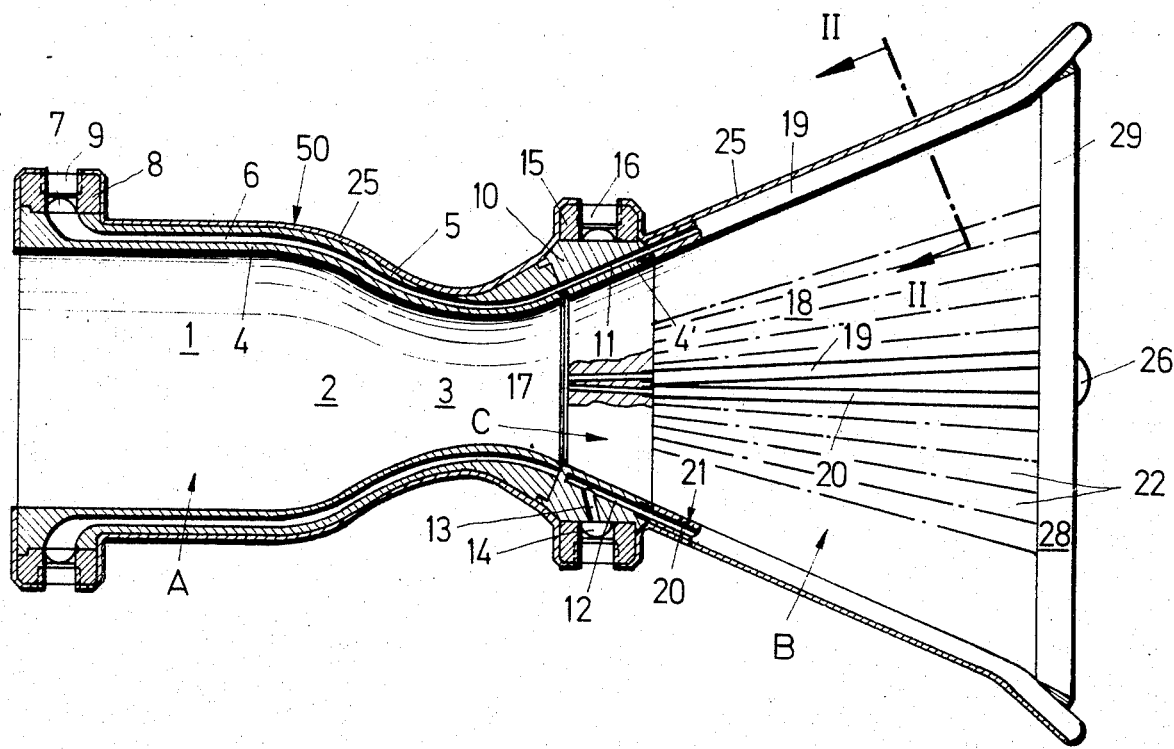

PATENTED OCT 30 1973 3,768,256

INVENTORS
Karl Butter
Michael Kaufmann
Helmut Dederra

By *McGlew & Toren*

ATTORNEYS

THRUST GAS GENERATOR HAVING A COMBUSTION CHAMBER AND THRUST NOZZLE REGENERATIVELY COOLED BY A LIQUID

SUMMARY OF THE INVENTION

This invention relates in general to the construction of thrust gas generators, and in particular, to a new and useful thrust gas generator having a combustion chamber portion and a thrust nozzle which terminates in a thrust gas discharge and wherein the generator is cooled by a liquid medium, preferably a fuel component such as a liquid fuel of a rocket propulsion engine.

As is well known, the rocket combustion process in which one strives for a high pressure ratio in order to attain higher efficiency, takes place at very high temperatures. None of the materials which are presently known can withstand such very high temperatures without having some protection in the form of a cooling of the combustion chamber and thrust nozzle wall portions. In the combustion chamber of this type, a liquid medium which is fed through flow paths which are arranged longitudinally along the combustion chamber and thrust nozzle walls are exposed to the hot combustion gas temperatures and it provides a wall cooling function. For energy conservation reasons a fuel component is used in most instances as the cooling medium and this is commonly fed into the longitudinally arranged flow paths or passages through an entrance collector ring which is located at the rear end of the thrust nozzle, that is, at the discharge end. This liquid is then collected at the exit collector ring located at the forward or closed end of the combustion chamber after being heated on the way through the flow passages and then it is subsequently fed to the injection head for injection into the combustion chamber, for example.

A design of combustion chamber of the above type has become known in which the wall to be cooled of the combustion chamber thrust nozzle is built up exclusively from tubes which touch each other laterally over their entire lengths. As a result, the tubes which constitute the flow paths for the cooling medium correspond to the diameter of the combustion chamber-thrust nozzle which changes over the entire length. These flow paths have cross sections which vary over their entire length and they attain medium values in the region of the combustion chamber portion, minimum values in the thrust nozzle neck portion, and maximum values at the rear end or discharge end of the thrust nozzle. The manufacture of such tubes requires a large expenditure of technical labor. The pressure-tight fastening of the tubes with one another to form the combustion chamber and the thrust nozzle wall to be cooled, is achieved by an outer wall which makes contact with the radial outer portions of the tubes and which is applied such as by electroplating and is firmly joined with the individual tubes only by linear contact.

A combustion chamber having a single piece base body to form the inner wall of the combustion chamber has been proposed and such a device includes longitudinal cooling channels which are milled out from the outer surface of the combustion chamber to form longitudinal grooves which are separated by lands. The lands are adapted to geometric configuration and are subject to locally different thermal stresses and they have a medium width in the region of the combustion chamber, they decrease in width in the convergent part of the thrust nozzle and reach a minimum width at the nozzle neck portion of the thrust nozzle and increase again in width in the divergent part of the thrust nozzle up to a maximum value at the discharge end thereof. A complicated method of manufacturing is therefore required for the manufacture of these cooling channels. The cooling channels are closed off by an outer wall which is applied by electroplating. The individual grooves are closed at their radial outer surfaces or ends by an electroplated layer in order to form a closed cooling channel. The formation of the outer wall by an electroplating layer provides a crack-proof bond between the interior base portion of the wall and the outer wall layer even at extremely high pressures.

The present invention provides a construction which avoids the drawbacks of the known combustion chamber thrust nozzle constructions and provides a combustion chamber with a thrust nozzle which is inexpensive to manufacture and which is able to withstand extremely high combustion chamber pressures as well as extremely high temperatures and is also of relatively light weight. According to the invention, the construction of the thrust generator which includes a combustion chamber and a nozzle section leading to a thrust discharge is made up of various sections including a combustion chamber proper and a portion of the convergent part of the thrust nozzle with the thrust nozzle neck as an inner part. This inner part comprises a solid wall body having longitudinal cooling channels which are machined into the exterior surface and which is provided with an outer wall covering which is applied by electroplating which extends over the cooling channels and closes the top thereof. An outer part comprises the thrust nozzle or the divergent part of the thrust nozzle and is built up of capillary tubes arranged around a longitudinal axis of the thrust nozzle and which are spaced apart peripherally. The tubes have a constant cross section at least over a major portion of their length and they are secured by an electroplated layer which extends over a portion of their periphery and between the spaces therebetween in a pressure-tight manner. The layer advantageously positively surrounds the outer peripheral portions of the tubes. In addition, an intermediate part is arranged between the outer and inner parts that comprises a solid connecting piece with a number of longitudinal passages corresponding to the number of capillary tubes and which is connected by electroplating mechanically firmly and in a pressure-tight manner with the inner part. The outer part is connected by a non-removable plugged connection between its tubes and its longitudinal passages of the intermediate part and this connection is especially made by soldering or welding of the adjacent tube ends into the longitudinal receiving grooves.

The thrust generator which includes the combustion chamber with the thrust nozzle combines the advantages of the known and of the proposed combustion chamber thrust nozzle designs without having any of their drawbacks. The inner end part exhibits the same design as the proposed combustion chamber thrust nozzle design and is therefore superior as far as its resistance to the very large forces which are generated during operation due to the high combustion chamber pressures and temperatures. This is also true in respect to the corresponding parts of the known combustion chamber and thrust nozzle constructions which are constructed exclusively from a tube-formed inner wall and an electroplated layer bonding the tubes together and which touch the tubes only along a line contact. Because with the invention, this part extends only over the combustion chamber and a portion of the convergent part of the thrust nozzle relatively long cooling channel sections of variable width are not required. This fact has an extremely positive effect on the manufacturing costs and the manufacturing time for the inner part and on the overall construction of all three parts.

The outer part is constructed in a manner to bring about two further advantages. First the manufacturing costs are substantially lower because the capillary tube cross sections are kept constant over a large portion of the length of this part. This is in contradistinction to the thrust nozzles which are built up exclusively from tubes with cross sections which are variable over a large part of their length and with cooling channels having widths which are variable over a large part of their length. Secondly the weight of the part is substantially lower as large sections of the part circumference are not made up of capillary tubes and the outer wall which surrounds them, but exclusively by an electroplated layer which is of relatively low specific weight. Therefore, the construction exhibits a single wall construction strength and is lighter than the known combustion chamber thrust nozzle constructions, even those which are already fairly low in comparison to the thrust nozzles of the general construction in the prior art. The construction of the invention results in a further reduction of the manufacturing costs and in a low weight-performance ratio of the combustion chamber with the thrust nozzle and which comprises all three interconnected parts.

With the construction of the invention, sufficient cooling is always provided at all times in the outer part which comprises capillary tubes and the electroplated layer which bridges the interspaces between tubes. This is assured by making the electroplated layer of a material having good thermal conductivity and by the intimate bond of this material with the radially outwardly extending peripheral portions of the capillary tubes. In addition, the construction permits a relatively high velocity of the cooling medium over all, or large portions of, its path from one end of the outer part to the other. This is due to the fact that the tube cross sections are constant at least over a large portion of the tube length.

The advantageous combination of the outer and inner parts with a simply constructed intermediate part is accomplished by a simple mechanical joining of the parts to each end of the intermediate part. With the construction of the invention, all danger of high temperatures due to any electroplated bonding of the parts, in a manner similar to that in which it occurs during soldering or welding of such parts, is substantially eliminated by the construction arrangement. The tube ends of the outer part are first attached to the intermediate part at the location of the openings of the ends of the flow passages defined therein and this attachment is made in the non-removable and pressure-tight manner for example, by soldering. Only then is the mechanically rigid and pressure-tight connection of the intermediate part with the inner part made by electroplating, that is, without heat being supplied.

It is well known that with increasing combustion chamber pressures, the power yield of a rocket combustion engine will increase, but, due to the density increase caused by the pressure of the hot combustion gases, the intensity of the heat transfer from the hot combustion gases to the combustion chamber thrust nozzle wall also increases. In view of this, the convergent thrust nozzle part with the thrust nozzle neck, which is thermally particularly highly stressed as compared to the divergent thrust nozzle part, requires especially effective cooling in a high performance rocket combustion chamber in addition to the combustion chamber proper. In the development of the invention, therefore, a thrust nozzle part is proposed which comprises the divergent part of the thrust nozzle adjacent the discharge and which is made up of capillary tubes having longitudinal sections of variable cross section making up the entire circumference of the convergent part of the thrust nozzle with the thrust nozzle neck. These tubes have a constant cross section from the thrust nozzle neck to the rear end of the thrust nozzle and together with an electroplated layer which extends thereover and between the spaces therebetween, form a thermally less highly stressed divergent thrust nozzle part.

Of equal value to the thrust nozzle design, according to the invention, with respect to thermal capacity is an inner part which includes the combustion chamber and a thrust nozzle convergent portion and even the thrust nozzle neck which is made of a uniform design except for the diminishing width of the cooling channels from the closed end to the thrust nozzle neck. In this arrangement, the divergent thrust nozzle part at the outer end is also built up from capillary tubes of constant cross section and an electroplated layer bridges the interspaces between them and this layer positively surrounds the radially outwardly pointing peripheral regions of the capillary tubes.

Another thrust nozzle design which can be manufactured at particularly low costs is constructed from capillary tubes of a cross section which is constant over the entire tube length and which includes an electroplated layer bridging the spaces between the tubes and wherein the tubes are in lateral contact with one another only at a thrust nozzle neck portion. In this arrangement in contrast to the above mentioned construction, the circumference of the convergent thrust nozzle part as compared to the divergent thrust nozzle part is thermally more highly stressed. It is regeneratively cooled only in certain regions and is suited particularly for combustion chambers which are operated at medium or low pressures because with such systems the amount of heat produced, and to be removed per unit of time and area, is less. This heat value which varies over the lower length of the whole construction and which is called a 'heat flux' is lower than in the high pressure systems due to the pressure dependence of the heat transfer co-efficients.

In a particularly advantageous development of the invention, the electroplated layer bridging the interspaces between the capillary tubes of the outer part positively surrounds not only the radially outwardly pointed peripheral regions of the tubes but also the inner part and the intermediate part. In this manner the electroplated layer provides at the same time the mechanically strong and pressure-tight connection of the intermediate part with the outer part and the inner part with the intermediate part over a radial outer joint. At the radial inner joints, the inner part and the intermediate part are connectd according to another feature of the invention mechanically strong and in a pressure-tight manner by a seam produced by an electroplating. For safety reasons, it is at times appropriate to provide the combustion chamber with armor. In the case of the subject of the invention, such reinforcement of the combustion chamber does not cause additional effort with respect to manufacturing. It is only necessary to increase the layer thickness in the region of the inner part when the electroplated layer is being applied. This can be done in one operation.

In one form of design of the gas generator with a combustion chamber and a thrust nozzle in which the cooling medium is fed through an entrance collector ring located at the rear end of the thrust nozzle and it is drawn off through an exit collector ring located at the front end of the combustion chamber all of the longitudinal passages of the intermediate part on the side facing the rear part or discharge part are provided with capillary tubes non-removably attached thereto and which eminate from the entrance collector ring. The longitudinal passages extend through their ends facing the inner part into a cooling canal which leads to the exit collector ring.

In a further design form of the combustion chamber with the thrust nozzle according to the invention, in which an exit collector ring for drawing off the cooling medium is located at the front end or closed end of the combustion chamber, the longitudinal passages in the intermediate part carry a non-removably attached capillary tube of the outer part. The passages in the intermediate part are divided up into through holes and holes closed toward the inner end adjacent the inner part, the arrangement being such that one longitudinal closed passage is always arranged between two longitudinal through passages. The longitudinal through passages in turn pass on the side facing the inner part into a cooling channel going to the exit collector ring. The longitudinal holes which are closed toward the inner part are in connection through holes brought radially outwardly with a ring canal of an entrance collector ring surrounding the intermediate part. The capillary tubes of the outer part are in this design formed as legs of hairpin shaped tube elements, the ends of which connect into the channels at the rear end of the trailing part or discharge part. It has been found practical to bend the tube ends facing away from the intermediate part and outwardly toward the discharge of the device and to embed these tubes in the radially outer edge region of a stiff nozzle terminating ring. The nozzle terminating ring is electroplated at the same time as the electroplated layer is applied between the surfaces of the tubular elements forming the trailing or outer part of the thrust nozzle assembly. The nozzle terminating ring can also be designed as an entrance collector ring in those cases where the cooling medium is fed in at the rear end of the thrust nozzle. In addition, to its stiffening effect, an undisturbed discharge of the combustion gas flow at the end of the mouth is assured because of the fact that it is made flush with the interior electroplated layer between the tubes.

According to a further feature of the invention, the pressure-tight and force-locked joining of the collector ring or the combined exit and entrance collector rings is accomplished by shrinking them onto the associated parts and subsequently plating the adjacent parts together with an electroplated layer which combines the tubes into a homogenous composite and which extends around the collector ring structure.

Accordingly, it is an object of the invention to provide an improved thrust gas generator which includes a combustion chamber and thrust nozzle having a discharge made up of a plurality of parts comprising an inner part including the combustion chamber and/or a portion of the thrust nozzle, an outer part comprising the diverging portion of the thrust nozzle leading to the thrust gas discharge and an intermediate part between the outer and inner parts and wherein the inner part comprises a solid base wall having cooling channels machined into the exterior surface which extend longitudinally and an outer covering wall closing the tops of the cooling channels which is applied by electroplating, and wherein the outer part is constructed of spaced longitudinally extending capillary tubes which are interconnected by an outer layer of an electroplated material which extends over a portion of the tubes and in the spaces therebetween, and wherein the intermediate part comprises a solid connecting piece having a plurality of longitudinally extending passages corresponding to the number of capillary tubes which is connected with the inner part by electroplating and with the outer part by a non-removable plugged connection between its capillary tubes and the longitudinal passages effected especially by soldering or welding of the adjacent tube ends.

A further object of the invention is to provide a device such as a gas generator which includes a combustion chamber and a nozzle having a discharge wherein the generator is made up of a plurality of parts, at least one of them including a plurality of spaced tubular members arranged around the longitudinal axis and covered circumferentially by an electroplated layer and at least one of the parts including a section having cooling channels defined in the walls thereof which are covered by an electroplated material and which is joined to the first part.

A further object of the invention is to provide a device such as a thrust gas generator or rocket engine which is simple in design, rugged in construction and economical to manufacture.

The various features of novelty which characterize the invention are pointed out with particularity in the claims annexed to and forming a part of this specification. For a better understanding of the invention its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
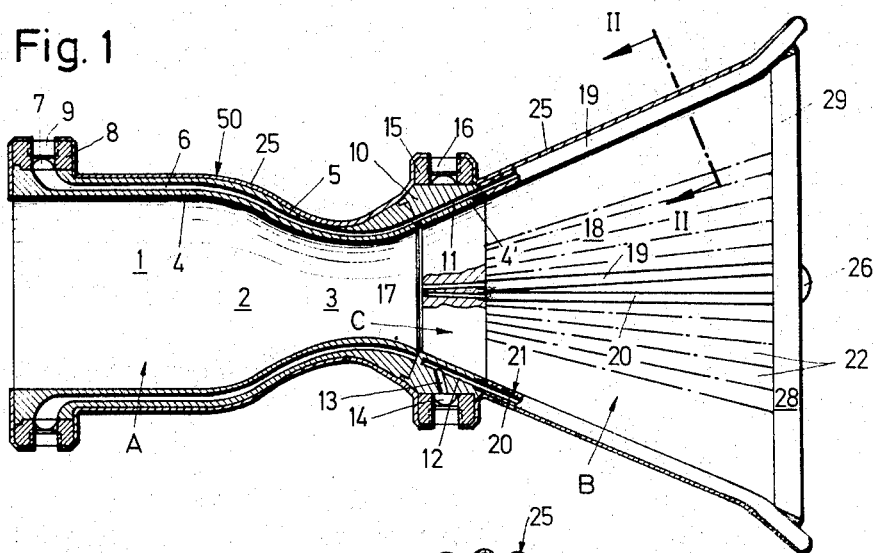
FIG. 1 is an axial sectional view of a thrust gas generator constructed in accordance with the invention.
Figure 2:
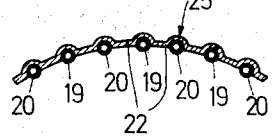
FIG. 2 is a section taken on the line II–II of FIG. 1.

Referring to the drawings in particular, the invention embodied therein in FIGS. 1 and 2 comprises a device such as a rocket engine of thrust gas generator generally designated 50 having a combustion chamber portIon 1, a convergent nozzle portion 2, a nozzle neck 3, and a divergent portion 18.

In accordance with the invention, the device includes three separate portions or parts comprising an inner part or combustion chamber part, part A, which includes the combustion chamber proper 1 and a convergent thrust nozzle part 2 and a portion of the nozzle neck 3. A feature of this construction is that it comprises a solid base body or wall 4 made of oxygen-free copper or a similar material such as silver or molybdenum having an outer surface with radially extending grooves which are machined, for example, by milling, to form longitudinal cooling channels 6 which are circumferentially spaced. The cooling channels 6 are separated from each other by each of the land portions defined between them. The width of the cooling channels 6 is constant over the length of the combustion chamber 1 but it decreases continuously from the rear end of the combustion chamber 1 to the thrust nozzle neck down to a minimal value at such location. The cooling channels 6 are covered on their radial outer side by an outer wall 5 which is applied by electroplating and which comprises an oxygen free copper material or its equivalent such as silver or molybdenum.

A further feature of the invention is the provision of a ring canal or ring conduit 7 which is formed within a collector ring 8 and which is shrunk onto the part A and which includes four discharge openings which are distributed around the circumference at uniform spacings and which are designated 9.

The device shown in FIGS. 1 and 2 also includes a thrust nozzle part generally designated B which comprises a divergent section 18 which expands outwardly to the discharge or rear end of the device, and an intermediate part generally designated C which comprises a solid connecting piece 10. The connecting piece 10 is provided with a wall 4' having longitudinally extending passageways or through-openings 11 and 12. Part of the openings 11 and 12 are through passages and part are closed toward the part A, that is, the inner part and these are distributed around the circumference of the intermediate part C in such a manner that there is always one longitudinal plugged through passage 12 located between two passages 11. Each through-passage 11 always passes into a cooling channel 6 of the part A whereas the passages 12 are closed toward the part A but they are in radial communication with a ring canal 14 of an entrance collecting ring 15 which is shrunk onto the part C. The collecting ring 15 includes four inlet openings 16 which are arranged around the circumference at uniform spacing. The intermediate part C is connected with the part A at a radial inner joint by a seam 17 which is produced by electroplating in a mechanically firm and pressure-tight manner.

The part B which is the outer part and includes the divergent thrust nozzle portion 18 has longitudinally arranged legs 19 and 20 of hairpin shaped tubular tubes or parts 21 which are of constant cross section and which include wall web portions or connecting elements 22 therebetween. The free ends of the tube legs 19 and 20 which form the front end of the divergent thrust nozzle part 18 are soldered into the longitudinal passages 11 and/or 12 of the part C in a pressure-tight manner. There is always one leg 19 which is in connection with the passage 11 and another adjacent leg 20 of a tube part 21 which is in connection with the through passage 12 which is closed at the inner end adjacent the part A. The web elements 22 are parts of an electroplated layer 25 of an oxygen free copper or an equivalent material such as silver or molybdenum which positively surrounds the radially outwardly directed portions of the legs 19 and 20. The electroplated layer 25 also surrounds the part C and the entrance collector ring 15 which is shrunk onto the latter. The layer 25 also surrounds the part A as well as the exit collector ring 8 which is shrunk onto the part A. The electroplated layer 25 is broken through only in the region of the discharge openings 9 of the exit collector ring 8 and at the inlet openings of the entrance collector ring 15. Due to the fact that the closed electroplated layer 25 extends from the front end of part A to the rear end of part B, it combines the tubular parts 21 of the divergent thrust nozzle part 18 to form a homogeneous composite structure bridging the interspaces between the two legs and bridging the outer joints between the parts B and C, the entrance collector ring 15 and the part C and the joint between the parts C and A as well as the exit collector ring 8 and the part A. The layer 25 also provides at all of these joints a mechanically strong and pressure-tight connection. When it is desirable, for safety reasons, to provide an armor on the part A, this function can also be assumed by the electroplated layer 25 if it is given a suitable layer thickness at such location.

The rounded ends 26 of the hairpin shaped tube parts 21 which connect the legs 19 and 20 are bent outwardly and embedded in the radially outer edge region of a nozzle terminating ring 28 which is electroplated over the curved ends 26 when the layer 25 is applied. The nozzle terminating ring 28 has a non-profiled inner surface which is flush with the wall elements 22 located within the region of the part b between the tubes legs 19 and 20.

The sensitive electroplated bonds between the wall 4 and the electroplated outer wall 7 of the part A are endangered if they are subjected to a non-uniform heating and cooling which would occur in the preparation of soldered or welded joints especially between work pieces of different mass or different material properties. For this reason the tube parts 21 are first soldered to the respective passages 11 and 12 of the part C before the seam bridging the radially inner joint between the part C and the part A and the layer 25 which bridges the radially outer joint between the parts C and A so that these joints are made by electroplating, that is without having to supply heat.

In the operation of the thrust gas generator; which is composed of the parts A and B and C, and the exit collector rings 8, the entrance collector ring 15, the electroplated layer 25 and the nozzle terminating ring 28, the cooling medium flows through the inlet opening 16 of the entrance collector ring 15 into the ring canal 14. The cooling liquid then moves from the ring canal 14 through the radially directed passages 13 into the longitudinally extending passages 12 of the part C which are closed at their ends which are adjacent the part A. From the longitudinal passages 12 of the parts C it passes into one of the legs 20 of the tube parts 21 and flows to the rear end of the part B and is redirected in the curved shaped end 26 of the part 21 through the other leg 20 back to the part C. It then moves through the passages 11 of the part C into the cooling channel 6 of the part A. The flow is then through the passages 6 to the front end of the part A to the ring canal 7 of the exit collector ring 8. The cooling medium leaves the ring 8 through the openings 9 and is fed into an injection head (not shown) for injection into the combustion chamber when a fuel component is employed as a cooling medium.

Figure 3:
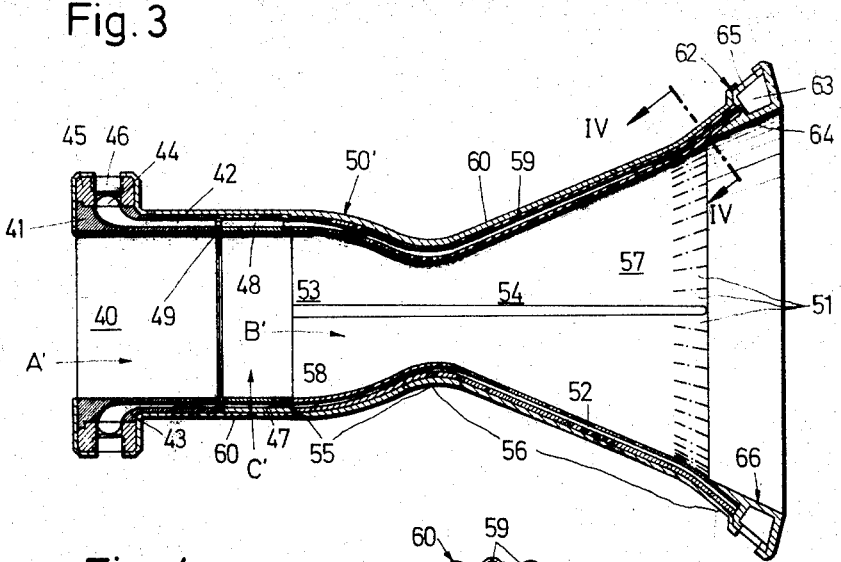
FIG. 3 is a view similar to FIG. 1 of another embodiment of the invention.
Figure 4:
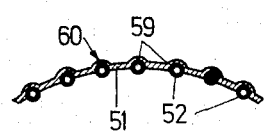
FIG. 4 is a section taken on the line IV–IV of FIG. 3.

In the embodiment illustrated in FIGS. 3 and 4, the thrust gas generator device or rocket engine generally designated 50' comprises a combustion chamber 40, a converging portion 53, a nozzle neck 54 and a diverging portion 57 leading to a rear end of discharge. The part A' comprises a wall forming a base body 41 with cooling channels 42 of constant width which are closed at their radial exteriors by an outer wall 43 which is applied by electroplating. The cooling channels 42 open at the front end of the part A into a ring canal 44 of an exit collector ring 45 which is shrunk fitted onto the part A. The ring 45 has four equally spaced discharge openings 46 which extend around the circumference of the ring.

In the embodiments of FIGS. 3 and 4, a solid connecting piece 47 forms an intermediate part C and an outer or rear part B includes the convergent portions 53, the neck portion 54 and the divergent portion 57. The connecting piece 47 includes a plurality of longitudinal passages 48 corresponding in number to the cooling channels 42 which are distributed around the circumference. The parts A' and C' are interconnected by a radially arranged inner joint which is electroplated in the form of a seam 49 to provide a mechanically strong and a pressure-tight construction. The longitudinal passage 48 is always aligned with a cooling channel 42.

An outer part or thrust nozzle part B' carries a plurality of capillary tubes 52 which are arranged around the circumference and extend parallel to the longitudinal nozzle axis which are interconnected by wall elements or webs 51 of an electroplated layer 59. The capillary tubes 52 have longitudinal sections of variable cross section to form the convergent thrust nozzle part 53 with the nozzle neck 54. The tube sections are arranged about the longitudinal nozzle axis in the manner such that they touch each other laterally and form a longitudinal section 56 of constant cross section extending from the neck to the outer end of the divergent part 57. The opposite ends 58 are soldered into the longitudinal passages 48 of the parts C so that they are always in connection with a cooling channel 42 of the part A' through the passages 48. The wall web portions 51 are parts of the electroplated layer 60 which positively surrounds the peripheral regions 59 of the tubes 52. The electroplated layer 60 also extends around the part C' the part A' with the exception of the discharge opening 46, and also the exit collector ring 45. These the capillary tubes 52 are connected at their radial outer portions 59 with each other while the part B' is also connected with the part C' and likewise the part A' with the part C'.

The ends of the capillary tubes 51 which face away from the part C' are bent outwardly and are soldered into distributor holes 64 which are located at the radially outer edge of a nozzle terminating ring 62. The ring 62 is designed as an entrance collector ring having a ring canal 63. The terminating ring 62 has inlet openings 65 and has a non-profiled inner surface 66 which is flush with the wall portions 51 of the electroplated layer 60 at the region of the inner contour of the part B'.

In the embodiment of FIGS. 3 and 4, the soldered connection between the capillary tubes 51 of the part B' and the longitudinal holes 48 of the part C' are made first before the electroplated joint between the parts A', B' and C'.

In operation, the cooling medium flows into the ring canal 63 of the nozzle terminating ring 62 through the inlet 65 and enters the capillary tubes 51 through the distribution opening 64. The cooling medium flows through the capillary tubes 51, the longitudinal passages 48 of the part C' and following these passages through cooling channels 42 to the front end of the part A. At the front end of the part A the cooling medium flows into the ring canal 44 of the exit collector ring 45. The cooling medium is then drawn off from the exit collecting ring 45 through the exit openings 46 and into an injector head (not shown) when the cooling medium is a fuel component.

What is claimed is:

1. A thrust gas generator, particularly a liquid fueled rocket propulsion engine, comprising a tubular combustion chamber and a nozzle having a converging wall extending from said combustion chamber to a narrow nozzle neck and a diverging portion terminating in a discharge, said combustion chamber and said nozzle comprising a plurality of interengaged parts including an inner part and at least one other part, said parts together defining the whole generator, said inner part comprising at least a portion of said combustion chamber, said other part comprising at least the diverging portion of said nozzle, said inner part having an inner body wall with a plurality of circumferentially spaced radially extending longitudinal ribs defining longitudinally extending cooling channels therebetween, said other part comprising a plurality of circumferentially arranged and circumferentially spaced tubes defining cooling passages, respective ones of said cooling passages communicating with respective ones of said cooling channels, and an electroplated layer circumferentially surrounding said tubes and bonded to the walls of said tubes and extending over said cooling channels and being bonded to the outer ends of said ribs and forming an exterior wall holding said parts together.

2. A thrust gas generator, according to claim 1, wherein said at least one other part includes an intermediate part and an outer part, said outer part having said tubes, and including said diverging portion of said nozzle, said intermediate part having a plurality of longitudinally extending intermediate passages corresponding to the number of said passages defined by said tubes, said intermediate part being connected to said inner part by said electroplated layer and having a plugged connection in at least some of said passages closing the communication between said passages and said cooling channels, said tubes being connected into said intermediate passages by soldering or welding.

3. A thrust gas generator, according to claim 1, wherein said tubes have a constant cross section over at least a major portion of their length and form the divergent portion of said thrust nozzle and said thrust nozzle neck, said tubes touching each other laterally only in the area of said neck at the narrowest cross section of said nozzle.

4. A thrust gas generator, according to claim 1, wherein said other part comprises said converging portion, said thrust nozzle and neck, and said diverging portion, said tubes comprising capillary tubes and having a variable cross section in the area of said convergent thrust nozzle portion, and said nozzle neck and having a constant cross section in the area extending from said thrust nozzle neck and diverging outwardly to said discharge.

5. A thrust gas generator, according to claim 1, wherein said at least one other part includes an intermediate part and an outer part said intermediate part being located between said outer part and said inner part said electroplated layer covering substantially the entire part of said intermediate part and said inner part.

6. A thrust gas generator, according to claim 4, wherein said electroplated layer in the region of said inner part is of a selected thickness comparable to the structural requirements thereof.

7. A thrust gas generator, according to claim 1, wherein said at least one other part includes an intermediate part and an outer part, said inner part and said intermediate part being connected together at their inner radial wall portions by an annular seam made by electroplating and at their radial outer wall portions by said electroplated layer in a mechanically strong and pressure-tight manner.

8. A thrust gas generator, according to claim 1, wherein said at least one other part includes an intermediate part and an outer part said intermediate part being located between said outer part and said inner part, an entrance collector ring located at the rear of said outer part and an exit collector ring located at the front of said inner part, each of said collector rings having annular passages communicating with said tubular passages and said cooling channels respectively.

9. A thrust gas generator particularly a liquid fueled rocket propulsion engine, comprising a tubular member formed of a plurality of longitudinally extending separate wall parts with a combustion chamber portion and a nozzle portion, said combustion chamber portion being of substantially uniform diameter, said nozzle portion including a converging portion, a narrow nozzle neck portion and a diverging portion terminating in a discharge proceeding from one end to the other, said tubular member comprising a first part including said combustion chamber, a converging portion of said nozzle neck and having an inner wall with longitudinally extending cooling channels arranged around the circumference, an intermediate part including a plurality of intermediate cooling passages arranged around the circumference in alignment with respective ones of said cooling channels and comprising a diverging portion of said nozzle, and an outer part including the remaining divergent portion of said nozzle and terminating in said discharge and having a plurality of capillary tubes extending along the length thereof arranged in spaced circumferential relationship said first part, said intermediate part and said outer part forming the entire length of said tubular member, and an electroplated layer extending around the circumference of the entire length of said tubular member covering the tops of said channels and being bonded to said inner wall and to said tubes around a portion of the outer periphery thereof and joining said parts together.

10. A thrust gas generator, according to claim 9, including an entrance ring extending around said intermediate part and communicating with alternate ones of said circumferentially spaces intermediate passages, said alternate ones of said passages being plugged at the ends thereof which are adjacent said inner part, said outer part tubes being connected in circumferential progression to respective ones of said passages, said cooling channels being connected to respective circumferentially progressing passages around the periphery.

11. A thrust gas generator for liquid fueled rocket propulsion engine comprising a tubular member forming a combustion chamber and a thrust nozzle, said tubular member being formed of a plurality of longitudinally extending separate wall parts each with an inside wall portion with longitudinally extending circumferentially spaced cooling passages defined therein and including a first part with longitudinally extending tubes defining the cooling passages and a second part with circumferentially spaced radially extending longitudinally extending ribs defining exteriorly opening cooling channels therebetween forming said cooling passages, and an outer electroplated layer extending completely around the circumference of said inner wall bonded over said tubes and extending between the exterior ends of said ribs to close said channels and to form an exterior wall holding said parts together.

12. A thrust gas generator, according to claim 11, including an entrance collector ring duct arranged at said discharge and connected to said tubes, and an exit collector ring duct arranged at the inner end of said inner part and connected to said cooling channels, said exit collector ring duct having an inner surface substantially flush with the inner surface of the said electroplated layer.

13. A thrust gas generator, according to claim 12, wherein said inlet collector ring duct is connected around its inner periphery to said tubes, said tubes comprising bent tube elements having respective leg portions extending from said inlet collector duct ring to said inner part and being connected to respective cooling channels of said inner part said tubes being nonremovably fastened to said inlet collector ring duct.

14. A thrust gas generator, according to claim 12, wherein said collector ring ducts are shrunk fit on the associated parts.

15. A thrust gas generator, according to claim 12, wherein said collector ring ducts are shrunk fitted on the associated parts and are surrounded except at their inlet and outlet openings by said electroplated layer.

* * * * *